United States Patent
Zafar et al.

(10) Patent No.: US 10,717,873 B2
(45) Date of Patent: Jul. 21, 2020

(54) LIQUID LIGNIN COMPOSITION, LIGNIN-BASED RESIN, AND METHOD OF INCREASING THE SOLUBILITY OF LIGNIN

(71) Applicant: Stora Enso OYJ, Helsinki (FI)

(72) Inventors: Ashar Zafar, Älta (SE); Dimitri Areskogh, Bromma (SE); Jesper Ekström, Johanneshov (SE)

(73) Assignee: Stora Enso OYJ, Helsinki (FI)

( * ) Notice: Subject to any disclaimer, the term of this patent is extended or adjusted under 35 U.S.C. 154(b) by 0 days.

(21) Appl. No.: 16/079,039

(22) PCT Filed: Mar. 20, 2017

(86) PCT No.: PCT/IB2017/051592
§ 371 (c)(1),
(2) Date: Aug. 22, 2018

(87) PCT Pub. No.: WO2017/163163
PCT Pub. Date: Sep. 28, 2017

(65) Prior Publication Data
US 2019/0048192 A1 Feb. 14, 2019

(30) Foreign Application Priority Data

Mar. 21, 2016 (SE) ..................................... 1650372

(51) Int. Cl.
| | | |
|---|---|---|
| *C07G 1/00* | (2011.01) | |
| *C08L 61/14* | (2006.01) | |
| *C08L 97/00* | (2006.01) | |
| *C09J 197/00* | (2006.01) | |
| *C08G 8/38* | (2006.01) | |
| *C08G 8/34* | (2006.01) | |
| *C08G 8/10* | (2006.01) | |
| *C08H 7/00* | (2011.01) | |

(52) U.S. Cl.
CPC .............. *C08L 97/005* (2013.01); *C07G 1/00* (2013.01); *C08G 8/10* (2013.01); *C08G 8/34* (2013.01); *C08G 8/38* (2013.01); *C08H 6/00* (2013.01); *C08L 61/14* (2013.01); *C09J 197/005* (2013.01); *C08L 2201/54* (2013.01)

(58) Field of Classification Search
None
See application file for complete search history.

(56) References Cited

U.S. PATENT DOCUMENTS

| | | | | | |
|---|---|---|---|---|---|
| 2,503,297 A | * | 4/1950 | Pierce | ..................... | D21H 17/23 530/504 |
| 2,674,321 A | * | 4/1954 | Cutforth | ................. | C04B 24/18 166/293 |
| 2,688,611 A | * | 9/1954 | Jones | ....................... | C08H 6/00 530/507 |
| 2,775,580 A | * | 12/1956 | Scarth | ..................... | C04B 24/18 530/504 |
| 3,006,874 A | * | 10/1961 | Cambron | ................. | C08G 8/28 527/403 |
| 3,216,839 A | * | 11/1965 | Webster | .................. | C08L 61/06 106/501.1 |
| 3,395,033 A | * | 7/1968 | Remer | ................... | C09J 197/00 106/190.1 |
| 4,113,675 A | | 9/1978 | Clarke et al. | | |
| 4,908,099 A | * | 3/1990 | DeLong | ................. | D21B 1/021 162/21 |
| 5,470,433 A | | 11/1995 | Brodersen et al. | | |
| 5,959,167 A | * | 9/1999 | Shabtai | .................. | C10G 1/002 585/240 |
| 2008/0050792 A1 | * | 2/2008 | Zmierczak | ............. | C10G 1/002 435/161 |
| 2009/0209739 A1 | * | 8/2009 | Funaoka | .............. | B01J 20/0211 530/502 |
| 2013/0060071 A1 | * | 3/2013 | Delledonne | ............. | C07C 37/54 585/310 |
| 2015/0119560 A1 | | 4/2015 | Ters et al. | | |
| 2019/0048192 A1 | * | 2/2019 | Zafar | ....................... | C08G 8/34 |

FOREIGN PATENT DOCUMENTS

| | | |
|---|---|---|
| CA | 707382 | 4/1965 |
| CN | 104194002 | 12/2014 |
| GB | 644791 | 10/1950 |
| JP | S63112677 | 5/1988 |
| JP | 2002146317 | 5/2002 |
| RU | 2009129419 | 2/2011 |
| WO | 2006031175 | 3/2006 |
| WO | 2013144454 | 10/2013 |

(Continued)

OTHER PUBLICATIONS

Teknikaliteter och Trivialiteter. The Document appears to have been downloaded from the Internet on Aug. 21, 2018 and bears a notation that it was "updated" on Aug. 8, 2005.
International Searching Authority, Written Opinion of the International Searching Authority, PCT/IB2017/051592, dated May 24, 2017.
International Searching Authority, International Search Report, PCT/IB2017/051592, dated May 24, 2017.
Pfungen, L., "Lignin Phenol Formaldehyde Wood Adhesives," University of Natural Resources and Life Sciences, Vienna, Department of Material Sciences and Process Engineering, Institute of Wood Technology and Renewable Materials, 2015, pp. 11-20.
Khan, M.A., Ashraf, S.M., "Studies on Thermal Characterization of Lignin—Substituted Phenol Formaldehyde Resin as Wood Adhesive," Journal of Thermal Analysis and Calorimetry, 2007, vol. 89, No. 3, pp. 993-1000.

(Continued)

*Primary Examiner* — Peter A Salamon
(74) *Attorney, Agent, or Firm* — Greer, Burns & Crain Ltd.

(57) ABSTRACT

The present invention relates to a liquid lignin mixture comprising 3-50 wt % methanol, 12-50 wt % lignin and 5-85 wt % aqueous alkali solution wherein the concentration of said aqueous alkali solution is 1 to 50 wt % of alkali in water, based on the weight of said alkali solution prior to mixing with the other components of the mixture. The liquid lignin mixture can be used to manufacture lignin-based phenolic resins, which are particularly useful in the manufacture of laminates.

10 Claims, No Drawings

(56) References Cited

FOREIGN PATENT DOCUMENTS

| WO | 2014055463 | 4/2014 |
| WO | 2014080033 | 5/2014 |
| WO | 2014159704 | 10/2014 |
| WO | 2015079107 | 6/2015 |
| WO | WO-2015086772 A1 * | 6/2015 |

OTHER PUBLICATIONS

Lee, S.J., et al., "Isolation and Characterization of Lignin from the Oak Wood Bioethanol Production Residue for Adhesives," International Journal of Biological Macromolecules, 2015, vol. 72, pp. 1056-1062.
Pizzi, A., "Bioadhesives for Wood and Fibres: A Critical Review," Rev. Adhesion Adhesives, vol. 1, pp. 88-113.
Buranov, Anvar U., and Mazza, G., "Fractionation of Flax Shives by Water and Aqueous Amonia Treatment in a Pressurized Low-Polarity Water Extractor," Journal of Agricultural and Food Chemistry, 2007, vol. 55, pp. 8548-8555.
Safety Data Sheet, Safe Work Australia Code of Practice.
Technical Data Sheet, Specification, Carl Roth GmbH.
Cetin, Et al. "Studies on Lignin-Based Adhesives for Particleboard Panels", Tubitak, 183-189, 2002.
Oezmen, Nilguel. "Lignin Based Adhesive for Particleboard Production", School of Agricultural and Forest Sciences, Selected Pages, 2000, Abs., pp. iii-xvi and p. 77 only.

* cited by examiner

LIQUID LIGNIN COMPOSITION, LIGNIN-BASED RESIN, AND METHOD OF INCREASING THE SOLUBILITY OF LIGNIN

This application is a U.S. National Phase under 35 U.S.C. § 371 of International Application No. PCT/IB2017/051592, filed Mar. 20, 2017, which claims priority under 35 U.S.C. §§ 119 and 365 to Swedish Application No. 1650372-4, filed Mar. 21, 2016.

FIELD OF THE INVENTION

The present invention relates to a liquid lignin mixture comprising 3-50 wt % methanol, 12-50 wt % lignin and 5-85 wt % aqueous alkali solution wherein the concentration of said aqueous alkali solution is 1 to 50 wt % of alkali in water, based on the weight of said alkali solution prior to mixing with the other components of the mixture. The liquid lignin mixture can be used to manufacture lignin-based phenolic resins, which are particularly useful in the manufacture of laminates.

BACKGROUND

Lignin, an aromatic polymer is a major constituent in e.g. wood, being the most abundant carbon source on Earth second only to cellulose. In recent years, with development and commercialization of technologies to extract lignin in a highly purified, solid and particularized form from the pulp-making process, it has attracted significant attention as a possible renewable substitute to primarily aromatic chemical precursors currently sourced from the petrochemical industry.

Lignin, being a polyaromatic network has been extensively investigated as a suitable substitute for phenol during production of phenol-formaldehyde adhesives. These are used during manufacturing of structural wood products such as plywood, oriented strand board and fiberboard. During synthesis of such adhesives, phenol, partially replaced by lignin, is reacted with formaldehyde in the presence of either basic or acidic catalyst to form a highly cross-linked aromatic resins termed novolacs (when utilizing acidic catalysts) or resoles (when utilizing basic catalysts). Currently, only limited amounts of the phenol can be replaced by lignin due to the lower reactivity of lignin. Lignin is utilized as a powder at the time that it is incorporated into the resin formulation. Lignin can also be utilized in "liquid form" in an alkali solution in order to avoid lignin dust. If the moisture content of the powder lignin is relatively low (0-5%), it can be dusty and may create respiratory hazards. If the moisture content of the solids is relatively high (8-50%), it can be sticky or clumpy and difficult to transfer in reliable and quantitative manner.

The major problem concerning the use of lignin alkali solution is that the viscosity of the lignin solution becomes too high if the lignin content is increased to a certain level. In a resin for laminates, the solid content of the resins is typically higher than for example in plywood and the amount of water in the lignin solution makes it difficult to produce a resin with higher solid content.

U.S. Pat. No. 3,216,839 describes solubility properties of free lignin in a solution of essentially methanol or only a small amount of water. It is described that the solubility effects are only observed at a high concentration of methanol and in the absence of alkali.

For certain types of applications, such as in the preparation of laminates, there is thus a need to be able to increase the lignin content in the resins used.

SUMMARY OF THE INVENTION

It has now surprisingly been found that the addition of 3-50 wt % (percent by weight) methanol can increase the solubility of lignin in an alkali solution. The increased solubility of lignin allows the addition of a higher concentration of lignin to the mixture.

The present invention is thus directed to a mixture comprising 3-50 wt % methanol, 12-50 wt % lignin and 5-85 wt % aqueous alkali solution, wherein the concentration of said aqueous alkali solution is 1 to 50 wt % of alkali in water, based on the weight of said alkali solution prior to mixing with the other components of the mixture.

The present invention is also directed to resins obtained using said solution and the use of said resins in the manufacture of laminates. The present invention is also directed to laminates manufactured using said resins.

The present invention is also directed to a method for increasing the solubility of lignin comprising the steps of adding 3-50 wt % of methanol to a mixture comprising 5-85 wt % aqueous alkali solution and 10-50 wt % lignin.

DETAILED DESCRIPTION

It is intended throughout the present description that the expression "lignin" embraces any kind of lignin, e.g. lignin originated from hardwood, softwood or annular plants. Preferably the lignin is an alkaline lignin generated in e.g. the Kraft process. The lignin may then be separated from the black liquor by using the process disclosed in WO2006031175.

In one embodiment of the invention, the mixture comprises 5-85 wt % alkali solution. In one embodiment of the invention, the mixture comprises 5-50 wt % alkali solution. In one embodiment of the invention, the mixture comprises 30-50 wt % alkali solution, such as 35-50 wt % alkali solution, such as 40-50 wt % alkali solution. The concentration of said aqueous alkali solution is 1 to 50 wt % of alkali in water, based on the weight of said alkali solution prior to mixing with the other components of the mixture. In one embodiment, the concentration of the alkali solution is 1-50 wt %. In one embodiment, the concentration of the alkali solution is 5-50 wt %. In one embodiment, the concentration of the alkali solution is 20-50 wt %, such as 20-40 wt % of alkali in water, based on the weight of said alkali solution prior to mixing with the other components of the mixture.

In one embodiment of the invention, the mixture comprises 10-50 wt %, such as 11-50 wt %, such as 12-50 wt %, such as 15-50 wt %, such as 35-50 wt %, such as 35-45 wt % lignin.

In one embodiment of the invention, the mixture comprises 3-50 wt % methanol, such as 3-40 wt %, 5-20 wt %, 5-15 wt %, 10-40 wt %, 10-30 wt % or 5-12 wt % of methanol.

Thus, one embodiment of the present invention is a mixture comprising 3-50 wt % methanol, 10-50 wt % lignin and 5-50 wt % aqueous alkali solution, wherein the concentration of said aqueous alkali solution is 5 to 50 wt % of alkali in water, based on the weight of said alkali solution prior to mixing with the other components of the mixture.

One embodiment of the present invention is a mixture comprising 3-50 wt % methanol, 12-50 wt % lignin and 5-50 wt % aqueous alkali solution, wherein the concentration of said aqueous alkali solution is 5 to 50 wt % of alkali in water, based on the weight of said alkali solution prior to mixing with the other components of the mixture.

One embodiment of the present invention is a mixture comprising 3-50 wt % methanol, 12-50 wt % lignin and 5-85 wt % aqueous alkali solution, wherein the concentration of said aqueous alkali solution is 1 to 50 wt % of alkali in water, based on the weight of said alkali solution prior to mixing with the other components of the mixture.

The alkali is preferably sodium hydroxide, potassium hydroxide, calcium hydroxide, magnesium hydroxide or a mixture thereof.

In one embodiment of the present invention, the mixture is heated at 30 to 95° C. In one embodiment, said heating is carried out for at least 15 minutes, such as from 15 minutes to 10 hours.

One embodiment of the present invention is a method for increasing the solubility of lignin comprising the steps of adding 3-50 wt % of methanol to a mixture comprising 5-85 wt % aqueous alkali solution and 10-50 wt % lignin.

One embodiment of the present invention is a method for increasing the solubility of lignin comprising the steps of adding 3-50 wt % of methanol to a mixture comprising 5-50 wt % aqueous alkali solution and 10-50 wt % lignin.

One embodiment of the present invention is a method for increasing the solubility of lignin comprising the steps of adding 3-50 wt % of methanol to a mixture comprising 5-85 wt % aqueous alkali solution and 12-50 wt % lignin.

The present invention also relates to a resin composition prepared using the mixture described above. The resin composition is preferably a lignin-phenol-formaldehyde resin. Said resin composition can be prepared by adding phenol and formaldehyde to the mixture described above and heating said mixture. Typically, the amount of phenol added is approximately the same as the amount of lignin, but it is appreciated that more or less phenol can be added depending on what type of resin composition that is desired. The heating is typically carried out at a temperature of 60-95° C. such as 70-85° C. for 2-8 hours such as 4-8 hours.

The resin obtained is useful for example in the manufacture of laminates. The resin is then impregnated into and/or applied between the sheets that should form the laminate and said sheets are pressed together and heated at a temperature of about 130-150° C.

There are a number of advantages of the mixture described above, including:
decreased viscosity
improved processability.

There are a number of advantages of utilizing a resin composition manufactured from the mixture described above:
a resin with a higher amount of lignin can be obtained,
a resin with better reactivity can be obtained.

The present invention also relates to the use of the resin composition in engineered wood products such as plywood, particle board, wafer board, gluelam beams, structural composite lumber, oriented strand board (OSB), oriented strand lumber (OSL) and other applications such as laminates, insulation and molding compounds.

EXAMPLES

Example 1

To a mixture of methanol, water and an aqueous sodium hydroxide solution (concentration: 50 wt % of NaOH in water), was added kraft lignin. The mixture was stirred for approximately 5 minutes and subsequently heated in an oven at 55° C. for 1-21 hours. The viscosities of lignin solutions were measured at 25° C. using a Brookfield DV-II+LV viscometer. Viscosity values are illustrated in Table 1.

TABLE 1

| Lignin [wt %] | Methanol [wt %] | Aq sol NaOH, 50 wt % [wt %] | $H_2O$ | Viscosity [cP] |
|---|---|---|---|---|
| 35 | 0 | 16 | 49 | 254 |
| 35 | 10 | 16 | 39 | 103 |
| 37.5 | 0 | 16 | 46.5 | 758.8 |
| 37.5 | 10 | 16 | 36.5 | 501.5 |
| 40 | 0 | 16 | 44 | 1993 |
| 40 | 10 | 16 | 34 | 1108 |

Example 2

Phenolic resin was synthesized with a phenol replacement level of 25%. In the first step, lignin solution was prepared by mixing of 105 g of kraft lignin (solid content 95%), 160 g of water, 31.2 g of methanol and 23.2 g of 50% sodium hydroxide solution in a 1 liter glass reactor equipped with overhead stirrer, condenser and temperature control unit. Lignin solution was heated to 80° C. and continued heating at 80° C. for one hour. Then, the temperature of the lignin solution was decreased to 45° C.

In the second step, 304 g of phenol and 271.6 g of formalin (concentration 52.5%) were added to the lignin solution. The temperature was increased to 85° C. The reaction was monitored by measuring the viscosity using the Brookfield DV-II+LV viscometer. The reaction mixture was continuously heated at the temperature at 85° C. until the viscosity was about 106 cP at 25° C.

The resin was analyzed and the results of the analysis are given in Table 2.

TABLE 2

| Resin Properties | |
|---|---|
| S.C (%) | 57.2 |
| Visc. (cP) @25° C. | 106 |
| pH | 9.0 |
| Gel time (min) @100° C. | 76 |

The gel time was measured by adding 10 g of the resin in a glass tube with a stamper made of aluminium. The glass tube was heated at 100° C. in an oil bath. The stamper was moving up and down until the resin became gel. The time until the resin become gel was measured as gel time.

It can be seen in the Table 2 that the solid content, pH, viscosity and gel time of the resin is on a suitable level for the phenolic resin used for laminates.

In view of the above detailed description of the present invention, other modifications and variations will become apparent to those skilled in the art. However, it should be apparent that such other modifications and variations may be effected without departing from the spirit and scope of the invention.

The invention claimed is:

1. A mixture comprising 3-50 wt % methanol, 12-50 wt % lignin and 5-85 wt % aqueous alkali solution, wherein the concentration of said aqueous alkali solution is 1 to 50 wt % of alkali in water, based on the weight of said alkali solution prior to mixing with the other components of the mixture.

2. A mixture according to claim 1, comprising 40-50 wt % aqueous alkali solution.

3. A mixture according to claim 1, comprising 35-50 wt % lignin.

4. A mixture according to claim 3, comprising 40-50 wt % lignin.

5. A mixture according to claim 1, wherein the alkali is sodium hydroxide, potassium hydroxide, calcium hydroxide, magnesium hydroxide or a mixture thereof.

6. A mixture according to claim 1, comprising 3-30 wt % methanol.

7. A mixture according to claim 6, comprising 3-12 wt % methanol.

8. A mixture according to claim 1, wherein said mixture has been heated at a temperature of 30-95° C.

9. A resin obtainable by adding phenol and formaldehyde to a mixture according to claim 1 and heating at a temperature of 70-90° C. for 2-8 hours.

10. A laminate manufactured using a resin according to claim 9.

* * * * *